(12) United States Patent
Moribe et al.

(10) Patent No.: US 6,178,282 B1
(45) Date of Patent: *Jan. 23, 2001

(54) ATTACHING ARRANGEMENT OF AN OPTICAL CABLE CASE TO A CONTAINER BOX OF A COMMUNICATION APPARATUS

(75) Inventors: Makoto Moribe, Tokyo; Hironobu Goto, Miyagi; Kazuki Yoshida, Tokyo; Tsuyoshi Imaizumi, Kanagawa; Hitoshi Takeda; Kiyotaka Tanaka, both of Tokyo, all of (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/977,425

(22) Filed: Nov. 24, 1997

(30) Foreign Application Priority Data

Nov. 22, 1996 (JP) .................................................. 8-311627

(51) Int. Cl.[7] ...................................................... G02B 6/36
(52) U.S. Cl. ............................................. 385/134; 385/136
(58) Field of Search .................................... 385/134–137, 385/147

(56) References Cited

U.S. PATENT DOCUMENTS

| | | | |
|---|---|---|---|
| 4,770,357 | * 9/1988 | Sander et al. | 242/400.1 |
| 4,824,196 | * 4/1989 | Bylander | 385/134 |
| 4,948,220 | * 8/1990 | Violo et al. | 385/55 |
| 5,069,516 | * 12/1991 | Kohy et al. | 385/147 |
| 5,335,349 | * 8/1994 | Kutsch et al. | 455/6.1 |
| 5,511,144 | * 4/1996 | Hawkins et al. | 385/135 |

FOREIGN PATENT DOCUMENTS

| | | |
|---|---|---|
| 62-163003 | 7/1987 | (JP) . |
| 4-116805 | 10/1992 | (JP) . |
| 8-262239 | 10/1996 | (JP) . |
| 10-339817A | * 12/1998 | (JP) . |

* cited by examiner

Primary Examiner—Hemang Sanghavi
Assistant Examiner—Michael J Stahl
(74) Attorney, Agent, or Firm—Scully, Scott, Murphy & Presser

(57) ABSTRACT

An attaching arrangement for attaching, to a communications apparatus container box, an optical cable case which includes a case body for accommodating an optical cable and a case end portion attached to the case body. The attaching arrangement includes: a first rotary hinge having a first rotary hinge axis for rotatably attaching the case end portion to the container box around the first rotary hinge axis; and a second rotary hinge having a second rotary hinge axis perpendicular to the first rotary hinge axis for rotatably attaching the case end portion to the container box around the second rotary hinge axis. In a preferred implementation, the attaching arrangement further includes: a slide rail slidably attached to an inner surface of the container box along a direction parallel to the second rotary hinge axis so that the slide rail is slidable from an inside of the container box to an outside of the container box and from the outside of the container box to the inside of the container box. The first and second rotary hinges rotatably attach the case end portion to a forward end of the slide rail in an advancing direction in which the slide rail moves from the inside of the container box to the outside of the container box.

3 Claims, 3 Drawing Sheets

ATTACHING ARRANGEMENT OF AN OPTICAL CABLE CASE TO A CONTAINER BOX OF A COMMUNICATION APPARATUS

BACKGROUND OF THE INVENTION

This invention relates to a communication apparatus used in an open-air environment and, in particular, to an attaching arrangement of an optical cable case to a container box of the communication apparatus.

Typically, a communication apparatus of this type is attached to an open-wire or aerial communication cable extended between utility poles in a power network. For the purpose of protection against various influences from an open-air environment, the communication apparatus is accommodated in a container box. An optical cable case having a circular or a polygonal section is attached to the container box to accommodate a surplus length of an optical cable or an optical core line conversion cable.

Referring to FIGS. 1A and 1B, a container box 1 of a communication apparatus is illustrated with an optical cable case 2 attached thereto through a conventional attaching arrangement. Generally, the container box 1 is disposed in a vertical or a horizontal position depending upon a circumstance. A surplus length of an optical cable 10 to be accommodated in the optical cable case 2 is drawn into the optical cable case 2 in one direction with respect to a cable accommodating surface 5' of the optical cable case 2.

After its surplus length is accommodated in the optical cable case 2. an outlet portion of the optical cable 10 is clamped by a cable clamping portion 11 formed in the container box 1. Typically, the optical cable case 2 and the cable clamping portion 11 are individually fixed to the container box 1.

Since the cable clamping portion 11 is fixed in the container box 1, it is difficult to clamp the outlet portion of the optical cable 10 to the cable clamping portion 11.

The above-mentioned conventional attaching arrangement has several disadvantages. At first, the container box 1 can be disposed in the vertical or the horizontal position as described above. Depending upon the position of the container box 1, the cable accommodating surface 5' of the optical cable case 2 is also changed in position because it is fixed to the container box 1. The accommodating operation of the optical cable 10 is difficult when the accommodating surface 5' of the optical cable case 2 is disposed in one position of the vertical and the horizontal positions.

As a second problem, if the container box 1 has a small mounting space for the optical cable case 2, the optical cable case 2 must be removed from the container box 1 in order to accommodate the optical cable 10 in the optical cable case 2. After the optical cable 10 is accommodated, the optical cable case 2 is again mounted in the container box 1. At this time, a part of the optical cable 10 between the optical cable case 2 and the container box 1 may be caught on any peripheral component or pressed by the optical cable case 2 to be damaged.

As a third problem, it is difficult to clamp the optical cable 10 to the cable clamping portion 11 because it is fixed in the container box 1.

SUMMARY OF THE INVENTION

It is therefore an object of this invention to provide an attaching arrangement of an optical cable case to a container box of a communication apparatus, which is capable of achieving an improvement in operability upon an accommodating operation of an optical cable by adaptively changing a position of a cable accommodating surface of the optical cable case.

It is another object of this invention to provide an attaching arrangement of an optical cable case to a container box of a communication apparatus, which is capable of achieving an improvement in reliability upon a retracting operation of an optical cable by rotating and sliding the optical cable case so as to maintain a radius of curvature allowable to the optical cable.

It is still another object of this invention to provide an attaching arrangement of an optical cable case to a container box of a communication apparatus, which is capable of achieving an improvement in operability upon a clamping operation of an optical cable by forming a cable clamping portion on a slide rail movable to the outside of the container box.

According to this invention, there is provided an attaching arrangement for attaching, to a communication apparatus container box, an optical cable case which comprises a case body for accommodating an optical cable and a case end portion attached to the case body. The attaching arrangement comprises: a first rotary hinge having a first rotary hinge axis for rotatably attaching the case end portion to the container box around the first rotary hinge axis; and a second rotary hinge having a second rotary hinge axis perpendicular to the first rotary hinge axis for rotatably attaching the case end portion to the container box around the second rotary hinge axis.

Preferably, the attaching arrangement further comprises: a slide rail slidably attached to an inner surface of the container box along a direction parallel to the second rotary hinge axis so that the slide rail is slidable from an inside of the container box to an outside of the container box and from the outside of the container box to the inside of the container box. In this case, the first and second rotary hinges rotatably attach the case end portion to a forward end of the slide rail in an advancing direction in which the slide rail moves from the inside of the container box to the outside of the container box.

The attaching arrangement may further comprise: a cable clamping portion formed at a rearward end of the slide rail in the advancing direction in which the slide rail moves from the inside of the container box to the outside of the container box. The cable clamping portion clamps the optical cable which is accommodated by the case body.

DESCRIPTION OF THE PREFERRED EMBODIMENTS

Now, description will be made as regards an embodiment of this invention with reference to the drawings.

Figures 1A, 1B:
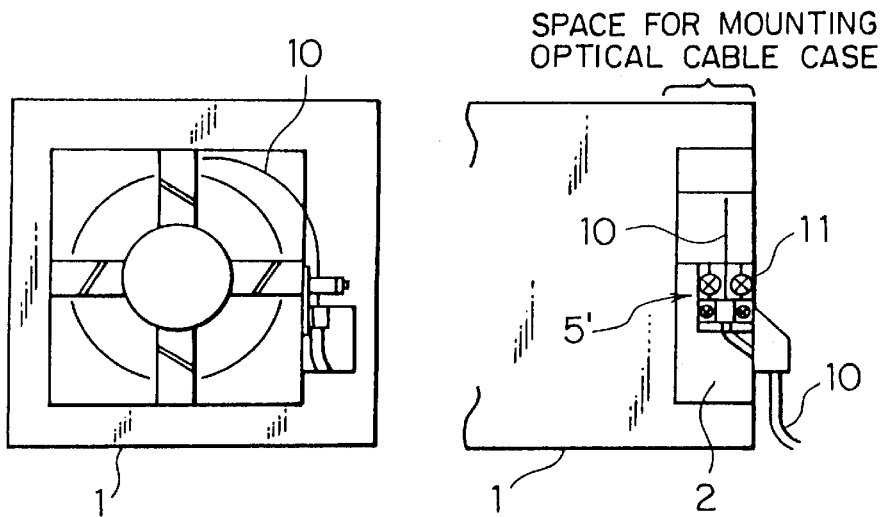
FIGS. 1A and 1B are a side view and a front view of a conventional attaching arrangement of an optical cable case to a container box of a communication apparatus, respectively.
Figure 2A:
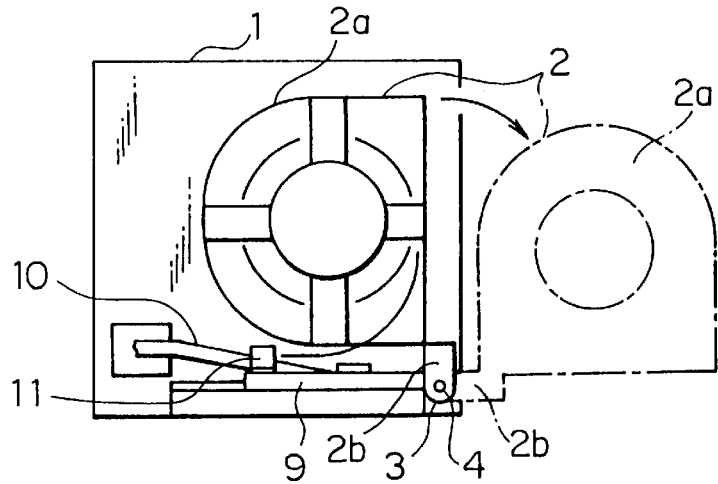
FIGS. 2A, 2B, and 2C are a side view and two front views of an attaching arrangement of an optical cable case to a container box of a communication apparatus in accordance with an embodiment of this invention, respectively.
Figure 2B:
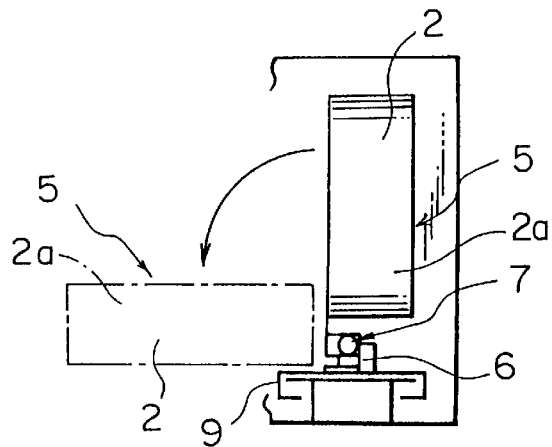
Figure 2C:
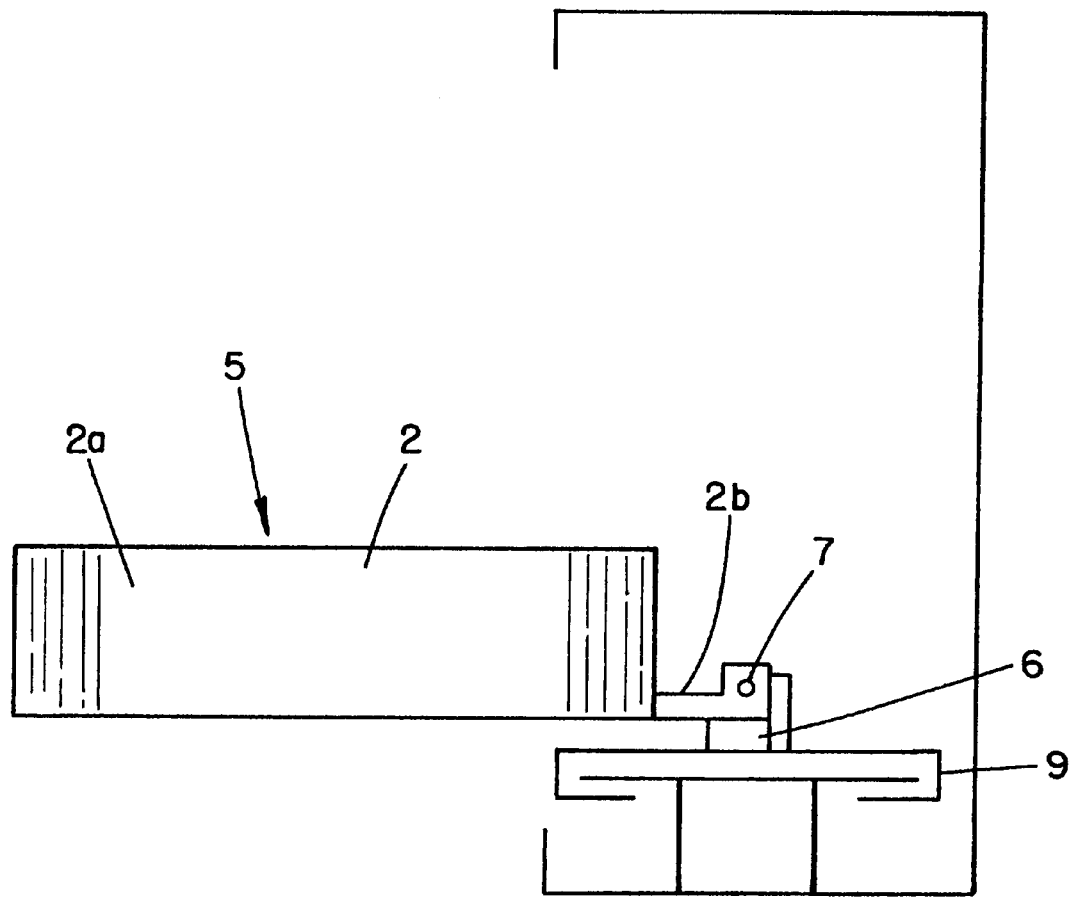

Referring to FIGS. 2A, 2B and 2C; a container box 1 of a communication apparatus is illustrated with an optical cable case 2 attached thereto through an attaching arrangement according to one embodiment of this invention. The optical cable case 2 has a case body 2a and a case end portion 2b which should be attached to the container box 1. The attaching arrangement includes a first rotary hinge 3 (FIG. 2A) having a first rotary hinge axis 4 and a second rotary hinge 6 (FIG. 2B) having a second rotary hinge axis 7 perpendicular to the first rotary hinge axis 4. The first rotary hinge 3 serves to rotatably attach the case end portion 2b of the optical cable case 2 to the container box 1 around the first rotary hinge axis 4. On the other hand, the second rotary hinge 6 serves to rotatably attach the case end portion 2b of the optical cable case 2 to the container box around the second rotary hinge axis 7. The optical cable case 2 has a cable accommodating surface 5 (FIG. 2B).

Figure 3:
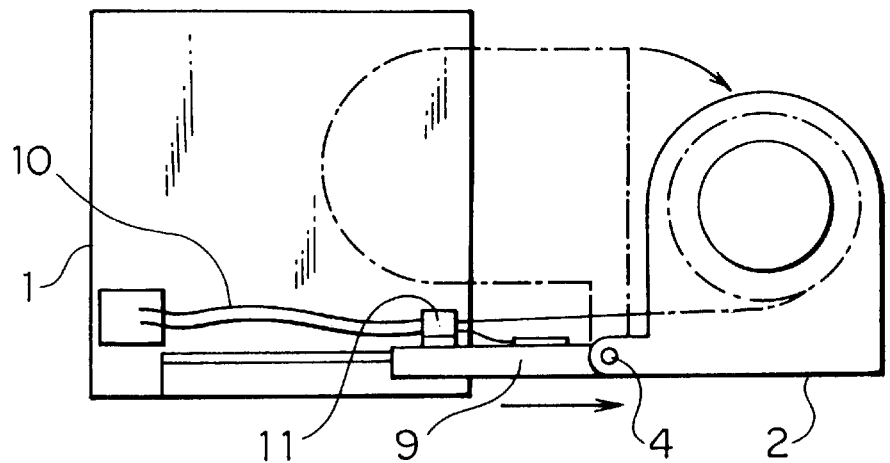
FIG. 3 is a side view for describing an operation of the attaching arrangement of FIGS. 2A, 2B and 2C.

Referring to FIG. 3 in addition to FIGS. 2A, 2B and 2C; the attaching arrangement further includes a slide rail 9 slidably mounted to an inner surface of the container box 1 along a direction parallel to the second rotary hinge axis 7 so that the slide rail 9 is slidable from an inside of the container box 1 to an outside of the container box 1 and from the outside of the container box 1 to the inside of the container box 1. The first and second rotary hinges 3, 6 rotatably attach the case end portion of the optical cable case 2 to a forward (or front) end of the slide rail 9 in an advancing direction (depicted by an arrow in FIG. 3) in which the slide rail 9 moves from the inside of the container box 1 to the outside of the container box 1.

At a rearward end of the slide rail 9 in the advancing direction, a cable clamping portion 11 is formed to serve as a fixture for clamping an outlet portion of an optical cable 10 accommodated in the container box 1.

Figures 4A, 4B:
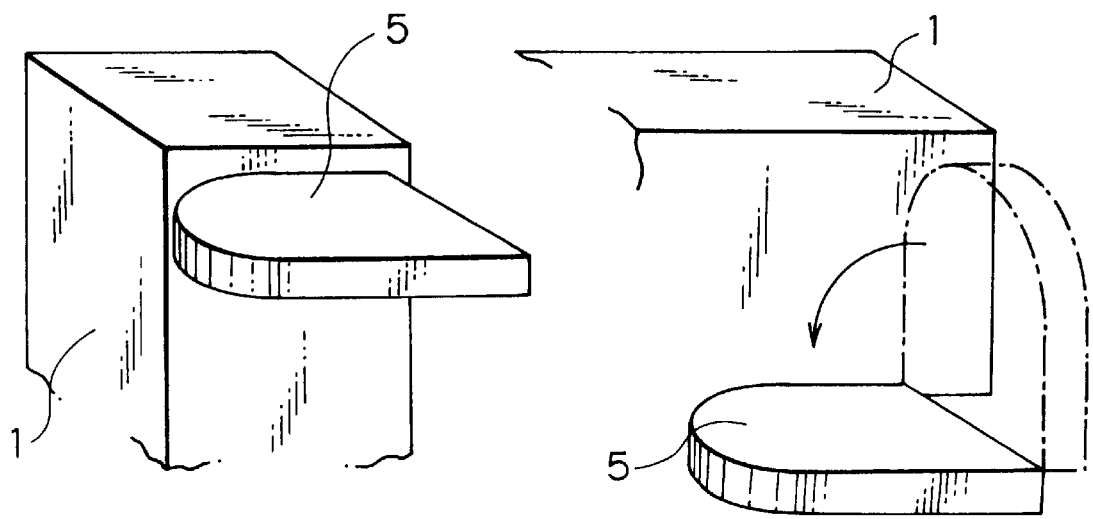
FIGS. 4A and 4B are perspective views which are for describing an operation of the attaching arrangement of FIGS. 2A, 2B and 2C and which show a cable accommodating surface of the optical cable case arranged in different positions when the container box is disposed in a vertical or a horizontal position, respectively.

Referring to FIGS. 4A and 4E, an operation of the attaching arrangement will be described. In an initial state, the optical cable case 2 is located within the container box 1. In order to perform an accommodating operation of the optical cable 10, the optical cable case 2 is rotated by 90° around the first rotary hinge axis 4 located at an opening of the container box 1 to be moved to a first position at the outside of the container box 1 illustrated in FIG. 3, in phantom in FIG. 2A, and schematically in FIG. 4A. In FIG. 4A, the container box 1 is disposed in a vertical position and the cable accommodating surface 5 of the optical cable case 2 is turned upside so that the accommodating operation of the optical cable 10 is easily performed. The optical cable case 2 can be further rotated by 90° around the second rotary hinge axis 7 perpendicular to the first rotary hinge axis 4 to be moved to a second position illustrated in FIG. 2C and schematically in FIG. 4B. In FIG. 4B, the container box 1 is disposed in a horizontal position and the cable accommodating surface 5 of the optical cable case 2 is again turned upside so that the accommodating operation is easy.

Since the case body 2a of the optical cable case 2 is rotatably supported by the slide rail 9 through the first and second rotary hinge axes 4 and 7, the case body 2a of the optical cable case 2 can be translated from the inside to the outside of the container box 1 together with the slide rail 9.

After the slide rail 9 is translated to the outside of the container box 1 together with the optical cable case 2 and the cable clamping portion 11, the outlet portion of the optical cable 10 can be easily clamped by the cable clamping portion 11.

A first advantage of this invention is that, irrespective of the vertical or the horizontal position of the container box, the optical cable can be easily put into the optical cable case.

Specifically, in case of the vertical position, the optical cable case is rotated around the first rotary hinge axis of the first rotary hinge to be moved to the outside of the container box so that the cable accommodating surface is turned upside. On the other hand, in case of the horizontal position, the optical cable case is further rotated around the second rotary hinge axis of the second rotary hinge 80 that the cable accommodating surface is again turned upside.

A second advantage of this invention is that, since a constant distance is kept between the cable clamping portion and a cable inlet of the optical cable case, it is possible to prevent the intermediate portion of the optical cable between the cable clamping portion and the optical cable case from being damaged when the slide rail is drawn out from the container box.

This is because the case body of the optical cable case is rotatably supported on the slide rail through the rotary hinge axes of the first and second rotary hinges so that the optical cable case and the slide rail can be translated to the outside of the container box.

As a third advantage, it is possible to perform the clamping operation of the optical cable at the outside of the container box.

Specifically, the cable clamping portion is formed on the slide rail and can be moved to an end portion of the container box when the slide rail is drawn Out from the container box.

What is claimed is:

1. An attaching arrangement for attaching, to a communications apparatus container box, an optical cable case which comprises a case body for accommodating an optical cable and a case end portion attached to said case body, said attaching arrangement comprising:

a first rotary hinge having a first rotary hinge axis for rotatably attaching said case end portion to said container box around said first rotary hinge axis; and a second rotary hinge having a second rotary hinge axis perpendicular to said first rotary hinge axis for rotatably attaching said case end portion to said container box around said second rotary hinge axis whereby the first and second rotary hinges are rotatably attached at substantially the same point on the container box.

2. An attaching arrangement as claimed in claim 1, wherein said attaching arrangement further comprises:

a slide rail slidably attached to an inner surface of said container box along a direction parallel to said second rotary hinge axis so that said slide rail is slidable from an inside of said container box to an outside of said container box and from the outside of said container box to the inside of said container box;

said first and second rotary hinges rotatably attaching said case end portion to a forward end of said slide rail in an advancing direction in which said slide rail moves from the inside of said container box to the outside of said container box.

3. An attaching arrangement as claimed in claim 2, wherein said attaching arrangement further comprises:

a cable clamping portion formed at a rearward end of said slide rail in said advancing direction in which said slide rail moves from the inside of said container box to the outside of said container box, said cable clamping portion clamping the optical cable which is accommodated by said case body.

* * * * *

UNITED STATES PATENT AND TRADEMARK OFFICE
CERTIFICATE OF CORRECTION

PATENT NO. : 6,178,282 B1  Page 1 of 1
DATED : January 23, 2001
INVENTOR(S) : M. Moribe et al.

It is certified that error appears in the above-identified patent and that said Letters Patent is hereby corrected as shown below:

Column 3,
Line 35, "4E" should read -- 4B --

Column 4,
Line 27, "O" should read -- out --.

Signed and Sealed this

Fifth Day of March, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,178,282 B1
DATED          : January 23, 2001
INVENTOR(S)    : M. Moribe et al.

It is certified that error appears in the above-identified patent and that said Letters Patent is hereby corrected as shown below:

<u>Title page,</u>
Item [73], Assignee, insert -- Sumitomo Electric Industries --

Signed and Sealed this

Eighteenth Day of March, 2003

JAMES E. ROGAN
*Director of the United States Patent and Trademark Office*